(No Model.)
J. REICHERT.
SEAT FOR VEHICLES.
No. 535,858. Patented Mar. 19, 1895.
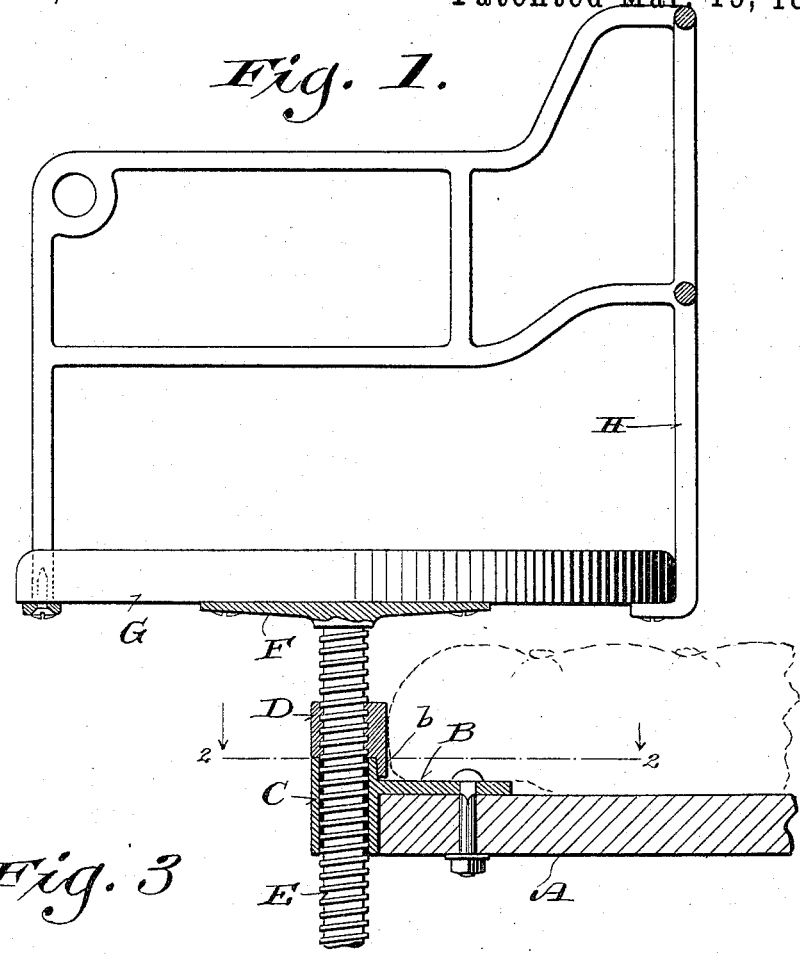
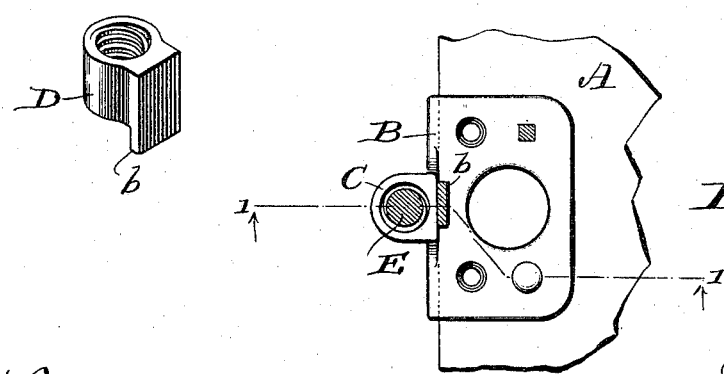
Witnesses
Geo. W. Irving.
N. E. Oliphant
Inventor
John Reichert,
By H. G. Underwood
Attorney

UNITED STATES PATENT OFFICE.

JOHN REICHERT, OF RACINE, WISCONSIN, ASSIGNOR OF ONE-HALF TO LUCIUS J. ELLIOT, OF SAME PLACE.

SEAT FOR VEHICLES.

SPECIFICATION forming part of Letters Patent No. 535,858, dated March 19, 1895.

Application filed May 17, 1894. Serial No. 511,579. (No model.)

*To all whom it may concern:*

Be it known that I, JOHN REICHERT, a citizen of the United States, and a resident of Racine, in the county of Racine, and in the State of Wisconsin, have invented certain new and useful Improvements in Seats; and I do hereby declare that the following is a full, clear, and exact description thereof.

My invention has for its object to provide a simple, economical seat attachable to any suitable base, but more particularly designed as a vertically adjustable third seat for detachable connection with a buggy-seat frame; and said invention consists in certain peculiarities of construction and combination of parts hereinafter set forth with reference to the accompanying drawings and subsequently claimed.

In the drawings: Figure 1 represents an elevation partly in section on line 1—1 of the succeeding figure illustrating an assemblage of parts involved in my invention as they appear in connection with a buggy-seat frame; Fig. 2, a plan view partly in section on line 2—2 of the preceding figure, and Fig. 3, a detail perspective view of a nut constituting part of my invention.

Referring by letter to the drawings A represents a buggy-seat frame, and bolted or otherwise rigidly secured to this frame is a bracket B herein shown as a right-angle plate cast in one piece with a vertical smooth-bore sleeve C, the latter being the outer part of the bracket and serving as a support for a nut D held against rotation by means of an offset lug *b* that depends therefrom and overlaps the vertical portion of said plate in rear of the sleeve. Engaging the nut is a screw-spindle E that extends down through the smooth-bore sleeve, and a plate F rigid on the upper end of the spindle is made fast to the under side of a seat G, the latter being shown as provided with a back H having eyes in which to fasten a stay-strap, this style of seat being designed for a child.

The height of the seat is regulated by the adjustment of the screw-spindle in the stationary nut and when said seat is not required for use, said spindle and nut thereon are lifted away from the smooth-bore sleeve that forms part of the bracket made fast to the buggy-seat frame under the cushion shown by dotted lines in Fig. 1.

From the foregoing it will be seen that three persons may be comfortably seated in a single buggy and that the supplemental seat is capable of instant detachment from the fixture, on the seat-frame of said buggy.

In order to adapt my device to supports other than a buggy-seat rail, the bracket-portion of said device may be indefinitely varied in the matter of design.

Having fully described my invention, what I claim as new, and desire to secure by Letters Patent, is—

1. A smooth-bore sleeve constituting the outer part of a bracket attachable to a suitable support, a non-rotative nut supported on the sleeve, a screw-spindle engaging the nut, and a seat joined to the upper end of the spindle, substantially as set forth.

2. A smooth-bore sleeve constituting part of a bracket attachable to a suitable support, a nut that rests on the sleeve and is provided with a depending offset lug overlapping the bracket, a screw-spindle engaging the nut, and a seat joined to the upper end of the spindle, substantially as set forth.

3. A bracket comprising a right-angle plate in one piece with a vertical sleeve, a nut that rests on the sleeve and is provided with an offset lug overlapping the vertical portion of said plate in rear of said sleeve, a screw spindle engaging the nut and a seat joined to the upper end of the spindle, substantially as set forth.

4. A vertical smooth-bore sleeve constituting the outer part of a bracket attachable to a suitable support, a nut held against rotation on the upper end of the sleeve but free to be lifted away from the same, a screw-spindle, engaging the nut, and a seat joined to the upper end of the spindle substantially as set forth.

In testimony that I claim the foregoing I have hereunto set my hand, at Racine, in the county of Racine and State of Wisconsin, in the presence of two witnesses.

JOHN REICHERT.

Witnesses:
GEO. D. FELLOWS,
L. T. BLAKE.